(12) United States Patent
Spahn et al.

(10) Patent No.: US 11,115,398 B2
(45) Date of Patent: Sep. 7, 2021

(54) METHODS AND DEVICES FOR PRESERVING RELATIVE TIMING AND ORDERING OF DATA PACKETS IN A NETWORK

(71) Applicant: ABB Power Grids Switzerland AG, Baden (CH)

(72) Inventors: Wolfgang Spahn, Bern (CH); Walter Binz, Bern (CH)

(73) Assignee: ABB POWER GRIDS SWITZERLAND AG, Baden (CH)

( * ) Notice: Subject to any disclaimer, the term of this patent is extended or adjusted under 35 U.S.C. 154(b) by 0 days.

(21) Appl. No.: 16/564,555

(22) Filed: Sep. 9, 2019

(65) Prior Publication Data

US 2019/0394180 A1  Dec. 26, 2019

Related U.S. Application Data

(63) Continuation of application No. PCT/EP2018/055622, filed on Mar. 7, 2018.
(Continued)

(51) Int. Cl.
*H04L 29/06* (2006.01)
*H04L 12/815* (2013.01)
(Continued)

(52) U.S. Cl.
CPC .......... *H04L 63/0485* (2013.01); *H04L 43/10* (2013.01); *H04L 45/22* (2013.01);
(Continued)

(58) Field of Classification Search
CPC ..... H04L 63/0485; H04L 43/10; H04L 45/22; H04L 45/38; H04L 63/0457;
(Continued)

(56) References Cited

U.S. PATENT DOCUMENTS

| | | | | |
|---|---|---|---|---|
| 4,914,697 A | * | 4/1990 | Dabbish | .................. G06F 21/72 |
| | | | | 380/264 |
| 6,226,290 B1 | * | 5/2001 | Salett | ..................... H04L 45/00 |
| | | | | 370/389 |

(Continued)

FOREIGN PATENT DOCUMENTS

| | | |
|---|---|---|
| CN | 1901509 A | 1/2007 |
| CN | 101567818 A | 10/2009 |

(Continued)

OTHER PUBLICATIONS

NPL Search (InnovationQ) (Year: 2021).*
(Continued)

*Primary Examiner* — Mahfuzur Rahman
*Assistant Examiner* — Richard W Cruz-Franqui
(74) *Attorney, Agent, or Firm* — Slater Matsil, LLP

(57) ABSTRACT

A packet network includes packet engines that perform packet handling. Cipher engines are provided separately from the packet engines for encryption and/or authentication operations. To preserve relative timing and ordering of data packets, a packet engine performs pre-shaping of data traffic, wherein the packet engine inserts dummy packets into a data flow. The packet engine provides the pre-shaped data traffic to a cipher engine.

43 Claims, 8 Drawing Sheets

Related U.S. Application Data

(60) Provisional application No. 62/610,164, filed on Dec. 23, 2017, provisional application No. 62/468,845, filed on Mar. 8, 2017, provisional application No. 62/468,808, filed on Mar. 8, 2017.

(51) Int. Cl.

| | | |
|---|---|---|
| *H04L 12/805* | (2013.01) | |
| *H04L 12/935* | (2013.01) | |
| *H04L 12/26* | (2006.01) | |
| *H04L 12/707* | (2013.01) | |
| *H04L 12/721* | (2013.01) | |
| *H04L 12/723* | (2013.01) | |

(52) U.S. Cl.
CPC .............. *H04L 45/38* (2013.01); *H04L 47/22* (2013.01); *H04L 47/365* (2013.01); *H04L 49/3018* (2013.01); *H04L 63/0457* (2013.01); *H04L 63/0471* (2013.01); *H04L 63/08* (2013.01); *H04L 45/50* (2013.01)

(58) Field of Classification Search
CPC ... H04L 63/0471; H04L 47/22; H04L 47/365; H04L 49/3018; H04L 63/08; H04L 45/50; H04L 9/0062; H04L 9/0618; H04L 63/0272; Y04S 40/20; G06F 21/602
See application file for complete search history.

(56) References Cited

U.S. PATENT DOCUMENTS

| | | | | |
|---|---|---|---|---|
| 6,272,117 B1* | 8/2001 | Choi | ................ | H04W 74/0866 370/330 |
| 6,708,273 B1* | 3/2004 | Ober | .................. | G06F 8/60 713/189 |
| 7,215,667 B1* | 5/2007 | Davis | ................. | H04L 12/4633 370/389 |
| 8,099,605 B1* | 1/2012 | Billsrom | ............ | G06F 11/1448 713/187 |
| 8,423,780 B2 | 4/2013 | Plotkin | ................ | H04L 9/085 713/182 |
| 8,621,539 B1* | 12/2013 | Monk | ................. | H04L 12/2898 725/111 |
| 8,667,273 B1* | 3/2014 | Billstrom | ........... | H04L 63/0428 713/165 |
| 10,476,798 B1* | 11/2019 | Siebenthaler | ........ | H04L 45/748 |
| 10,826,876 B1* | 11/2020 | Sinn | ...................... | H04L 63/123 |
| 2003/0131228 A1* | 7/2003 | Twomey | ................. | H04L 29/06 713/153 |
| 2003/0156715 A1* | 8/2003 | Reeds, III | ................ | H04L 9/12 380/37 |
| 2004/0177267 A1* | 9/2004 | Tada | ................... | H04N 21/6437 713/193 |
| 2005/0027543 A1* | 2/2005 | Labrou | ................. | G06Q 20/12 705/26.35 |
| 2006/0174009 A1* | 8/2006 | Martiquet | ........... | H04W 76/12 709/227 |
| 2007/0091886 A1* | 4/2007 | Davis | ................ | H04L 63/0485 370/389 |
| 2007/0101412 A1* | 5/2007 | Yang | .................... | H04L 9/3271 726/5 |
| 2007/0177599 A1* | 8/2007 | Yazaki | ................ | H04L 41/5022 370/392 |
| 2007/0180224 A1* | 8/2007 | Nakano | ................ | H04L 63/061 713/150 |
| 2008/0095367 A1* | 4/2008 | Maino | ................ | H04L 63/0435 380/256 |
| 2008/0109889 A1* | 5/2008 | Bartels | .................... | H04L 63/10 726/7 |
| 2009/0052655 A1* | 2/2009 | Semaev | ............... | H04L 9/0618 380/28 |
| 2009/0323932 A1* | 12/2009 | Youn | ...................... | H04L 9/002 380/30 |
| 2010/0014594 A1* | 1/2010 | Beheydt | .......... | H04N 21/23608 375/240.26 |
| 2010/0284404 A1 | 11/2010 | Gopinath et al. | | |
| 2010/0303233 A1* | 12/2010 | Inoue | ................ | H04W 12/0471 380/255 |
| 2010/0313015 A1 | 12/2010 | Hartmann et al. | | |
| 2012/0063381 A1* | 3/2012 | Huang | ............... | H04N 21/2385 370/312 |
| 2012/0128011 A1* | 5/2012 | Holmeide | ............ | H04L 63/105 370/474 |
| 2012/0172050 A1* | 7/2012 | Ledlie | ................ | H04W 12/033 455/456.1 |
| 2013/0111076 A1* | 5/2013 | Vaynberg | .............. | H04L 43/045 710/18 |
| 2014/0064481 A1 | 3/2014 | Abraham et al. | | |
| 2014/0208094 A1 | 7/2014 | Rajsic et al. | | |
| 2014/0233568 A1 | 8/2014 | Dong | | |
| 2015/0049246 A1* | 2/2015 | Kwon | .................... | H04N 21/47 348/464 |
| 2015/0063375 A1* | 3/2015 | Tzeng | ................... | H04J 3/0667 370/512 |
| 2015/0244828 A1* | 8/2015 | Heydon | ................ | H04H 20/71 709/232 |
| 2016/0014204 A1* | 1/2016 | Jiang | ................ | H04W 52/0216 370/235 |
| 2016/0149696 A1* | 5/2016 | Winslow | ................... | H04L 9/12 380/28 |
| 2016/0338120 A1* | 11/2016 | Boyle | .................... | G06T 3/4092 |
| 2017/0013450 A1* | 1/2017 | Ziv | ........................ | H04W 12/03 |
| 2017/0195297 A1* | 7/2017 | Nakano | ................. | G06F 21/606 |
| 2018/0019983 A1* | 1/2018 | Tissot | ................. | H04L 63/0428 |
| 2018/0227317 A1* | 8/2018 | Xu | ...................... | H04L 63/1466 |
| 2019/0394180 A1* | 12/2019 | Spahn | ................. | G06F 21/602 |

FOREIGN PATENT DOCUMENTS

| | | |
|---|---|---|
| CN | 101843040 A | 9/2010 |
| CN | 102549984 A | 7/2012 |
| CN | 104205753 A | 12/2014 |
| CN | 104584602 A | 4/2015 |

OTHER PUBLICATIONS

European Patent Office, International Search Report & Written Opinion issued in corresponding Application No. PCT/EP2018/055622, dated May 24, 2018, 9 pp.

European Patent Office, International Preliminary Report on Patentability issued in corresponding Application No. PCT/EP2018/055622, dated May 3, 2019, 21 pp.

\* cited by examiner

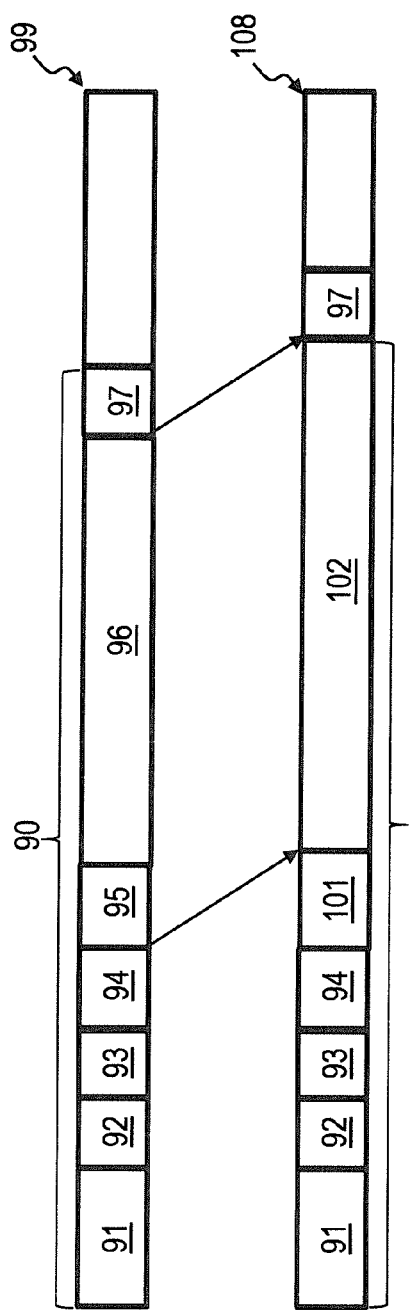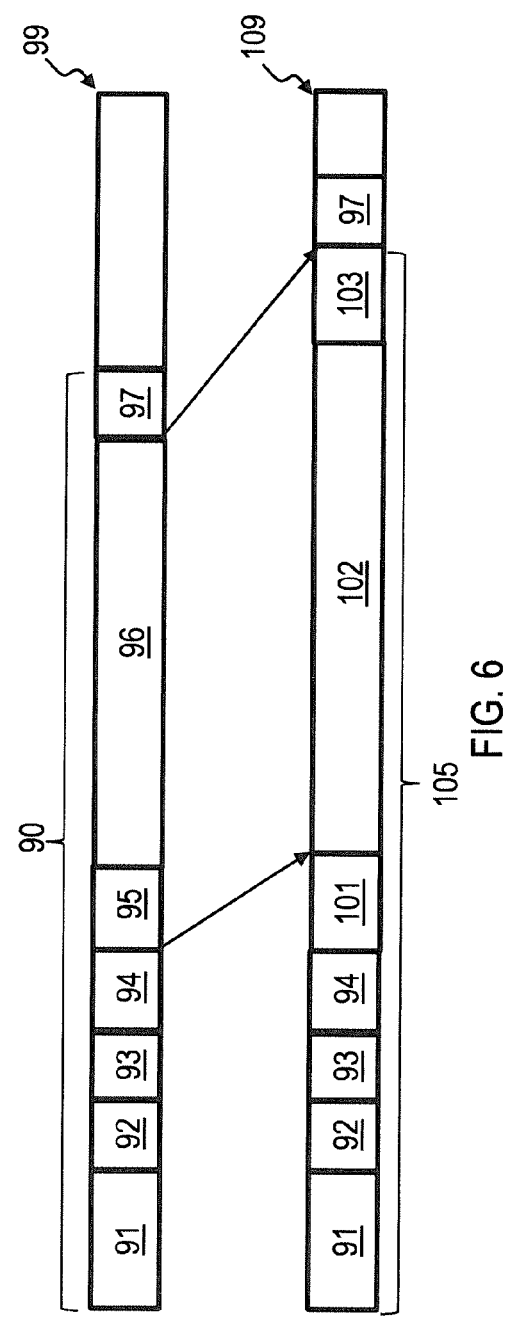
FIG. 5
FIG. 6

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             GAL              |  TC |S|       TTL              |
+-+-+-+-+-+-+-+-+-+-+-+-+-+-+-+-+-+-+-+-+-+-+-+-+-+-+-+-+-+-+-+-+
|0 0 0 1|Version|   Reserved   |        Channel Type            |
+-+-+-+-+-+-+-+-+-+-+-+-+-+-+-+-+-+-+-+-+-+-+-+-+-+-+-+-+-+-+-+-+
|            PID               |                                |
+-+-+-+-+-+-+-+-+-+-+-+-+-+-+-+                                 |
|                     SCC Message      (64 bytes)               |
~                                                               ~
+-+-+-+-+-+-+-+-+-+-+-+-+-+-+-+-+-+-+-+-+-+-+-+-+-+-+-+-+-+-+-+-+
|                            CRC                                |
+-+-+-+-+-+-+-+-+-+-+-+-+-+-+-+-+-+-+-+-+-+-+-+-+-+-+-+-+-+-+-+-+
```

FIG. 7

METHODS AND DEVICES FOR PRESERVING RELATIVE TIMING AND ORDERING OF DATA PACKETS IN A NETWORK

FIELD OF THE INVENTION

The invention relates to data transmission in packet networks. The invention relates in particular to methods and devices for transmitting data packets in a packet network that provide secure end-to-end paths or secure segments by using, e.g., encryption and/or authentication. The invention relates to such methods and devices that are suitable for mission critical applications such as, without limitation, industrial automation control systems, in particular networks for monitoring and controlling power installations. The invention relates in particular to methods and devices that preserve relative timing and ordering of packets in a cipher engine that performs encryption and/or authentication operations and/or during transmission along a secure end-to-end path.

BACKGROUND OF THE INVENTION

To secure integrity and authentication of data transmission in packet networks, information needs to be encrypted and/or authenticated. As a consequence, a major part of a packet in a data stream is replaced by its encrypted and/or authenticated counterpart. Conventionally, encryption and/or authentication protocols require the addition/elimination of packets to and from the stream, together with a respective enlargement or reduction of packet sizes. When combined with necessary parallel handling of processed and not-processed sub-streams at intermediate nodes of a meshed network, the changing stream characteristics due to the encryption and/or authentication may result in a significant variation of end-to-end delay and a changed packet order.

Even when encryption and/or authentication is performed at wire speed and inserts just a small constant delay, insertion of packets and enlargement of packet size can add non-deterministic delay, jitter and delay variation.

Significant variations of end-to-end delay and a changed packet order are generally not tolerable for deterministic control algorithms used in mission critical applications. One approach to address these problems associated with significant variations of end-to-end delay and a changed packet order is time stamping of critical packets just before transmission, i.e., after encryption and/or authentication operations have been performed. This may be undesirable for various reasons. For illustration, such an approach may add complexity. It also requires a device that performs the encryption and/or authentication operations to be placed in a time-stamping context, i.e., to be aware of and use the time stamping protocols.

SUMMARY

It is an object of the invention to provide improved methods, devices, and systems for data transmission in packet networks. It is in particular an object to provide improved methods, devices, and systems that provide encrypted and/or authenticated data transmission in a packet network, while mitigating the problems associated with non-deterministic delay, jitter and delay variation. It is also an object to provide improved methods, devices, and systems that preserve the packet ordering without requiring time stamping to be performed after encryption and/or authentication operations have been applied to a data packet.

According to exemplary embodiments, methods and devices are provided that perform data traffic pre-shaping by adding dummy packets and/or enlarging inter-packet gaps in a packet engine before data packets are time stamped and separated into parallel processed streams at intermediate nodes.

Due to the pre-shaping of data traffic, it is not required that additional data packets be added at a cipher engine that performs encryption and/or authentication operations. Data packets that are enlarged by the cipher engine grow only into empty inter-packet gaps. Therefore, separation and combination of a sub-stream that is 'to be processed' and a sub-stream that is 'not to be processed' at intermediate nodes naturally interleave. Packet timing and ordering is preserved.

Exemplary embodiments afford a wire-like determinism for encrypted and/or authenticated data packet transmissions, even when transiting through complex meshed network, because the disclosed methods and devices are capable of preserving the relative timing and ordering (a) without requiring new data packets to be inserted by a cipher engine that performs encryption and/or authentication operations, and (b) without requiring the cipher engine to perform time stamping after the encryption and/or authentication operations.

According to an aspect of the invention, a method of preserving relative timing and ordering of data packets transmitted in a packet network is provided. The packet network comprises packet engines that perform packet handling, wherein cipher engines are provided separately from the packet engines for encryption and/or authentication operations. The method comprises pre-shaping data traffic by a packet engine, wherein the packet engine inserts dummy packets into a data flow. The method comprises providing, by the packet engine, the pre-shaped data traffic to a cipher engine.

The cipher engine may be physically separated from the packet engine and may be connected to the packet engine via Ethernet or optical cables. Security is enhanced by physical separation of the cipher engine and the packet engine.

As used herein, the term "cipher engine" refers to a device configured to perform encryption/decryption and/or authentication operations. The cipher engine may optionally have dedicated components such as a physical random number generator for performing en/decryption and/or authentication operations.

As used herein, the term "dummy packets" refers to packets that do not include payload data and that may be filled with control information by the cipher engine.

The method may further comprise using, by the cipher engine, at least part of the dummy packets for management channel transmissions. The cipher engine may insert encryption and/or authentication related control information into at least part of the dummy packets. The dummy packets obviate the need for the creation of additional packets by the cipher engine.

The cipher engine may use the dummy packets for encryption key exchange.

The cipher engine may perform the encryption and/or authentication operations without insertion of additional packets into the data traffic.

Inserting the dummy packets into the data traffic may comprises the following steps: generating, by computer-readable instruction code executed on a central processing unit attached to a packet engine or comprised by the packet engine, a memory image and writing the memory image as a template to memory; configuring, by the computer-readable instruction code, a packet switch of the packet engine to fetch the image from the memory at a repetition interval; and fetching, by the packet switch, the image from the memory at the repetition interval and inserting the image into the data flow, the image being inserted in the data flow at a port that is configured by the computer-readable instruction code. These steps may be performed in response to a start-up of the packet engine, for example, or in response to a new user input.

The memory may be shared memory of the packet switch and the central processing unit.

The dummy packets may comprise empty section Signaling Communication Channel, SCC, packets.

The method may further comprise deleting, by the packet engine, SCC packets that exit an encrypted and/or authenticated data flow.

When the cipher engine adds control information to the dummy packets, thereby generating control packets, the cipher engine may add an additional outer Multiprotocol Label Switching (MPLS) header. The outer MPLS header may have the effect that intermediate nodes, such as packet switches, in the MPLS network do not see a Generic Associated Channel Label (GAL) SCC header. This assures that the GAL SCC packet is only deleted after an endpoint cipher engine strips an outer MPLS header. The end-to-end MPLS packet flow can be kept free from the control information added by the cipher engine.

Pre-shaping the data traffic may further comprise enlarging an inter-packet gap at an egress port of the packet engine.

Enlarging inter-packet gap may comprise inserting additional bytes into the data flow and/or delaying transmission of a data packet outgoing from the packet engine.

The cipher engine may grow a data packet into the inter-packet gap when performing the encryption and/or authentication operations. The cipher engine may grow the data packets into the inter-packet gap, respectively, without causing jitter, without introducing delays, and without requiring time stamping to be performed at the cipher engine.

A size of the enlarged inter-packet gap or may be configurable.

The method may further comprise determining a size of the enlarged inter-packet gap. The enlarged inter-packet gap may be configured such that the cipher engine respectively only grows a data packet into the inter-packet gap when performing the encryption and/or authentication operations, without changing the relative timing of successive data packets.

Determining the size of the enlarged inter-packet gap may comprise traversing all configured paths in the packet network that start on an interface of the packet engine; using the one of the configured paths requiring a maximum inter-packet gap to determine the enlarged inter-packet gap for the interface; and building, by a central processing unit, a register byte sequence and writing the register byte sequence into a packet switch register to trigger the packet switch to delay transmission of data packets outgoing from the packet engine.

The method may further comprise performing, by the packet engine, time stamping at an ingress port or an egress port of the packet engine.

The time stamping may be performed before the pre-shaped data traffic is provided to the cipher engine.

In the method, no time stamping may be performed by the cipher engine.

In the method, the cipher engine may operate without using the time stamping information.

In the method, the cipher engine may operate without having knowledge of any time stamping protocol, such as precision time protocol (PTP).

The cipher engine may operate outside a time stamping context of the packet network.

The packet engines may operate inside a time stamping context of the packet network.

The packet network may be an MPLS or MPLS Transport Profile (MPLS-TP) network.

The packet network may be a network of an industrial automation control system (IACS).

The packet network may be a packet network for automation of high voltage lines, steering high speed trains, or controlling air traffic.

The packet network may be a timed packet network.

A packet engine for handling data packets in a packet network according to an embodiment comprises an interface operative to be connected to a cipher engine that is provided separately from the packet engine; and at least one processing unit operative to control pre-shaping of data traffic that is output to the cipher engine via the interface, wherein the packet engine is operative to insert dummy packets into a data flow before the pre-shaped data traffic is provided to the cipher engine.

The packet engine may be operative to enlarge an inter-packet gap at the interface.

The packet engine may be operative to insert additional bytes into the data flow and/or delay transmission of a data packet outgoing from the packet engine to enlarge inter-packet gap.

The packet engine may be operative to allow a size of the enlarged inter-packet gap to be configured. The enlarged inter-packet may be configured such that the cipher engine respectively only grows a data packet into the inter-packet gap when performing the encryption and/or authentication operations, without changing the relative timing of successive data packets.

The packet engine or a control device connected to the packet engine may be operative to determine a size of the enlarged inter-packet gap. To this end, the packet engine or control device may be operative to traverse all configured paths in the packet network that start on an interface of the packet engine; and to use the one of the configured paths requiring a maximum inter-packet gap to configure a size of the enlarged inter-packet gap for the interface. A central processing unit of the packet engine may be operative to build a register byte sequence and to write the register byte sequence into a packet engine register to trigger the packet engine to delay transmission of data packets outgoing from the packet engine.

The packet engine may be operative to pre-shape the data traffic such that relative timing and ordering of data packets is preserved upon transmission over a secured end-to-end path, without requiring the cipher engine to insert additional data packets.

The packet engine may be operative to generate, using computer-readable instruction code executed on a central processing unit of the packet engine, a memory image and writing the memory image as a template to memory. The computer-readable instruction code may be operative to configure a packet switch of the packet engine to fetch the image from the memory at a repetition interval. The packet switch may be operative to fetch the image from the memory at the repetition interval and inserting the image into the data flow, the image being inserted in the data flow at a port that is configured by the computer-readable instruction code. These operations may be performed in response to a start-up of the packet engine, for example, or in response to a new user input.

The packet engine may be physically separated from the cipher engine and may be connected to the cipher engine via Ethernet or optical cables. Security is enhanced by physical separation of the cipher engine and the packet engine.

The dummy packets may comprise empty section Signaling Communication Channel (SCC) packets.

The packet engine may be operative to delete SCC packets that exit an encrypted and/or authenticated data flow.

The packet engine may be operative to perform time stamping at an ingress port or an egress port of the packet engine.

The packet engine may be operative to perform the time stamping before the pre-shaped data traffic is provided to the cipher engine.

The packet engine may be operative to perform the time stamping according to Precision Time Protocol (PTP) at an ingress/egress port. To enable proper timing precision of time stamping, pulse per second and clock signal may be provided to a chip responsible for time stamping at the ingress/egress port. In addition absolute time information may be delivered via a software message from an internal time master to respective port chip every 1 second. The chip for the egress port may add either absolute exit/entry time to incoming/outgoing packets or may add a resident time value to an already existing entry time information when packet is transiting node.

A cipher engine for performing encryption and/or authentication operations in a packet network comprises an interface operative to be connected to a packet engine that is provided separately from the cipher engine, the interface being operative to receive pre-shaped data traffic from the packet engine, wherein the cipher engine is operative to perform the encryption and/or authentication operations such that a relative timing and ordering of data packets is preserved upon transmission of encrypted and/or authenticated data over a secured end-to-end path in the packet network.

The cipher engine may be physically separated from the packet engine and may be connected to the packet engine via Ethernet or optical cables. Security is enhanced by physical separation of the cipher engine and the packet engine.

The cipher engine may be operative to perform the encryption and/or authentication operations without adding data packets to the pre-shaped data traffic.

The cipher engine may be operative to perform the encryption and/or authentication operations by increasing a size of data packets included in the pre-shaped data traffic such that there remains an inter-packet gap between consecutive data packets.

The cipher engine may grow the data packets into the inter-packet gap without causing jitter, without introducing delays, and without requiring time stamping to be performed at the cipher engine.

The interface may be operative to receive time stamped data packets from the packet engine.

The cipher engine may be operative to use at least part of the dummy packets for management channel transmissions. The cipher engine may be operative to insert encryption and/or authentication related control information into at least part of the dummy packets. The dummy packets obviate the need for the creation of additional packets by the cipher engine.

The cipher engine may be operative to use the dummy packets for encryption key exchange.

The cipher engine may be operative to perform the encryption and/or authentication operations without insertion of additional packets into the data traffic.

When the cipher engine adds control information to the dummy packets, thereby generating control packets, the cipher engine may be operative to add an additional outer Multiprotocol Label Switching (MPLS) header. The outer MPLS header may have the effect that intermediate nodes, such as packet switches, in the MPLS network do not see a Generic Associated Channel Label (GAL) SCC header. This assures that the GAL SCC packet is only deleted after an endpoint cipher engine strips the outer MPLS header. The end-to-end MPLS packet flow can be kept free from the control information added by the cipher engine.

A sub-rack for a packet network according to an embodiment comprises a network card comprising the packet engine according to an embodiment and an encryption card comprising the cipher engine according to an embodiment.

A packet network according to an embodiment comprises a plurality of packet engines according to an embodiment, each respectively connected to an associated cipher engine according to an embodiment.

The packet network may be an MPLS or MPLS Transport Profile (MPLS-TP) network.

The packet network may be a network of an industrial automation control system (IACS).

The packet network may be a packet network for automation of high voltage lines, steering high speed trains, or controlling air traffic.

The methods, devices, and systems for transmission of encrypted and/or authenticated data across complex, meshed packet network topologies preserves relative timing and ordering of packets in the cipher engine. Traffic pre-shaping by adding dummy packets and/or enlargement of inter-packet gaps in the packet engine is employed before the packets leave the PTP aware packet engine. Thereby, these operations do not need to be performed in the cipher engine, which therefore preserves the internal packet ordering and timing in the packet stream.

Embodiments of the invention may be employed in mission critical packet networks, such as automation of high voltage lines, steering high speed trains, or controlling air traffic, without being limited thereto.

BRIEF DESCRIPTION OF THE DRAWINGS

The subject-matter of the invention will be explained in more detail with reference to preferred exemplary embodiments which are illustrated in the attached drawings, in which:

FIG. 5 is a diagram illustrating a data packet prior to and after an encryption operation.

FIG. 6 is a diagram illustrating a data packet prior to and after encryption and authentication operations.

FIG. 7 illustrates a Generic Associated Channel Label (GAL) Signaling Communication Channel (SCC) packet that may be used by a packet engine and cipher engine according to an embodiment.

DETAILED DESCRIPTION OF EMBODIMENTS

Exemplary embodiments of the invention will be described with reference to the drawings in which identical or similar reference signs designate identical or similar elements. While some embodiments will be described in the context of exemplary networks, such as Multiprotocol Label Switching (MPLS) networks or MPLS-Transport Profile (MPLS-TP) networks, the methods and devices described in detail below may generally be used for transmission of encrypted and authenticated data through networks meshed, complex packet network topologies. The features of embodiments may be combined with each other, unless specifically noted otherwise.

As used herein, the term "packet" refers to a packetized data structure. The term "packet", as used herein, may include frames. A packet may be or may encompass a frame.

As used herein, the term "inter-packet gap" is synonymous to inter-frame gap and may designate a spacing between successive packets or frames on the physical layer.

As used herein, the term "cipher engine" refers to a device operative to perform encryption/decryption and/or authentication operations. The cipher engine may optionally have dedicated components such as a physical random number generator for performing encryption/decryption and/or authentication operations.

A "cipher engine", as described herein, may be implemented as a cipher engine instance. One hardware implementation of a cipher engine may provide plural cipher engine instances, e.g., an instance per port and direction. The cipher engine hardware may, however, in any case be separate from the respective packet engine.

As used herein, the term "packet engine" refers to a device operative to perform packet handling. The packet engine may include a packet switch, and may insert dummy packets into a flow of data packets. The packet engine is time-aware and may be operative to perform time stamping, e.g., at an egress port or an ingress port of the packet engine.

As used herein, a statement that an entity is disposed "between" two other entities (such as a cipher engine being disposed between a packet engine and a transit node) describes the arrangement along the data flow path, i.e., the sequence in which packets pass through the entities.

Figure 1:
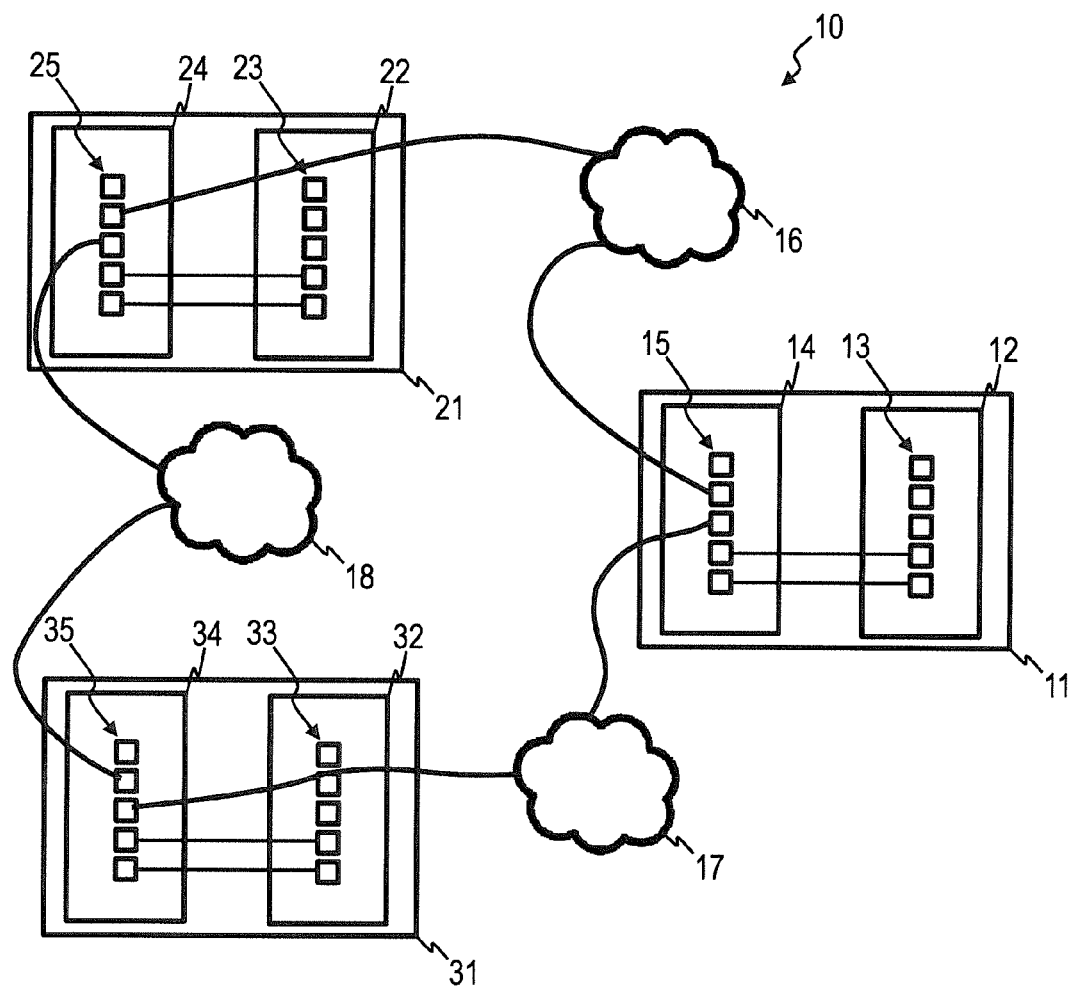
FIG. 1 is a schematic representation of a packet network comprising packet engines and cipher engines according to an embodiment.

FIG. 1 is a schematic representation of a packet network 10. The packet network 10 may be a timed packet network. The packet network 10 may have a plurality of nodes 11, 21, 31. The plurality of nodes 11, 21, 31 may respectively be communicatively coupled via MPLS-TP networks 16, 17, 18. The plurality of nodes 11, 21, 31 may include endpoint nodes and intermediate nodes (or hops) of a transmission path. The packet network 10 may be a timed network, with time stamping being performed by packet engines of the nodes 11, 21, 31.

The nodes 11, 21, 31 may respectively include a sub-rack. The sub-rack may comprise a network card comprising a packet engine and a separate encryption card comprising a cipher engine, which will be described more fully below.

The nodes 11, 21, 31 may respectively include a packet engine 12, 22, 32 and a cipher engine 14, 24, 34 that is physically separate from the associated packet engine 12, 22, 32. Each cipher engine 14, 24, 34 may be directly coupled to the associated packet engine 12, 22, 32, e.g., via Ethernet cables or via optical cables. Opposite ends of the Ethernet cables or optical cables may be directly attached to a packet engine 12, 22, 32 and a cipher engine 14, 24, 34.

Each packet engine 12, 22, 32 may respectively have a plurality of ports 13, 23, 33. Each cipher engine 14, 24, 34 may respectively have a plurality of ports 15, 25, 35. An ingress port of a cipher engine 14, 24, 34 may respectively be connected with an egress port of the associated packet engine 12, 22, 32. An egress port of a cipher engine 14, 24, 34 may respectively be connected with an ingress port of the associated packet engine 12, 22, 32. Each cipher engine 14, 24, 34 may be coupled to its associated packet engine 12, 22, 23 via an unencrypted link.

Different cipher engines 14, 24, 34 may transmit data traffic via encrypted paths, e.g., through the MPLS-TP network.

The packet engines 12, 22, 32 are respectively responsible for packet handling. The packet engines 12, 22, 32 may be responsible for packet forwarding, respective switching. All packet handling, filtering and queuing is done in the packet engines 12, 22, 32.

The cipher engines 14, 24, 34 perform encryption and/or authentication operations. It will be understood that the term "encryption operations" as used herein generally includes operations associated with encrypted transmissions and, thus, may encompass decryption at the receiving endpoint of a secure end-to-end path or at a node of a segment of a secure end-to-end path.

The cipher engines 14, 24, 34 may respectively have dedicated hardware such as a physical random number generator for performing en/decryption and/or authentication operations.

As will be explained in more detail below, the packet engines 12, 22, 32 and cipher engines 14, 24, 34 are operative to transmit encrypted and/or authenticated data across complex, meshed packet network topologies, while preserving relative timing and ordering of data packets in the cipher engines 14, 24, 34. To this end, the packet engines 12, 22, 32 may perform traffic pre-shaping, e.g., by adding dummy packets and/or by enlarging inter-packet gaps in the packet engine 12, 22, 32 before the data packets leave the Precision Time Protocol (PTP) aware packet engine 12, 22, 32 and enter the non-PTP aware cipher engine 14, 24, 34. Time stamping and insertion of additional data packets do not need to be performed inside the cipher engine 14, 24, 34. The packet ordering and timing of data packets in the data packet stream is preserved upon passage through the cipher engine 14, 24, 34.

The packet engines 12, 22, 32 may be controlled by a central control, e.g., a MPLS path management function. The cipher engines 14, 24, 34 may be controlled by a cyber security manager. The MPLS path management function and the cyber security manager may be executed on separate servers for enhanced security. The central control may configure the cipher engines to set up MPLS paths. The cipher engines 14, 24, 34 may respectively ensure end-to-end encryption and/or authentication for the paths through the network. The cipher engines 14, 24, 34 may be operative to provide encryption and/or authentication along segments of paths through the network. The cyber security manager may communicate with the cipher engines 14, 24, 34 via unencrypted channels or via secure channels.

Both working and protection paths may be established to form a bi-directional protected tunnel. As used herein, the term "working path" may in particular refer to a path that carries traffic during normal network operation, and the term "protection path" may in particular refer to a path used to protect and transport traffic when the working path fails, in accordance with RFC 7087, entitled "MPLS-TP Rosetta Stone" (December 2013), sections 3.42.1 and 3.42.2 and RFC 6372, entitled "MPLS-TP Survivability Framework" (September 2011). Entities, such as packet or cipher engines along the working path, are working entities in accordance with RFC 7087, entitled "MPLS-TP Rosetta Stone" (December 2013), section 3.42.1. Entities, such as packet or cipher engines along the protection path, are protection entities in accordance with RFC 7087, entitled "MPLS-TP Rosetta Stone" (December 2013), section 3.42.2.

Figure 2:
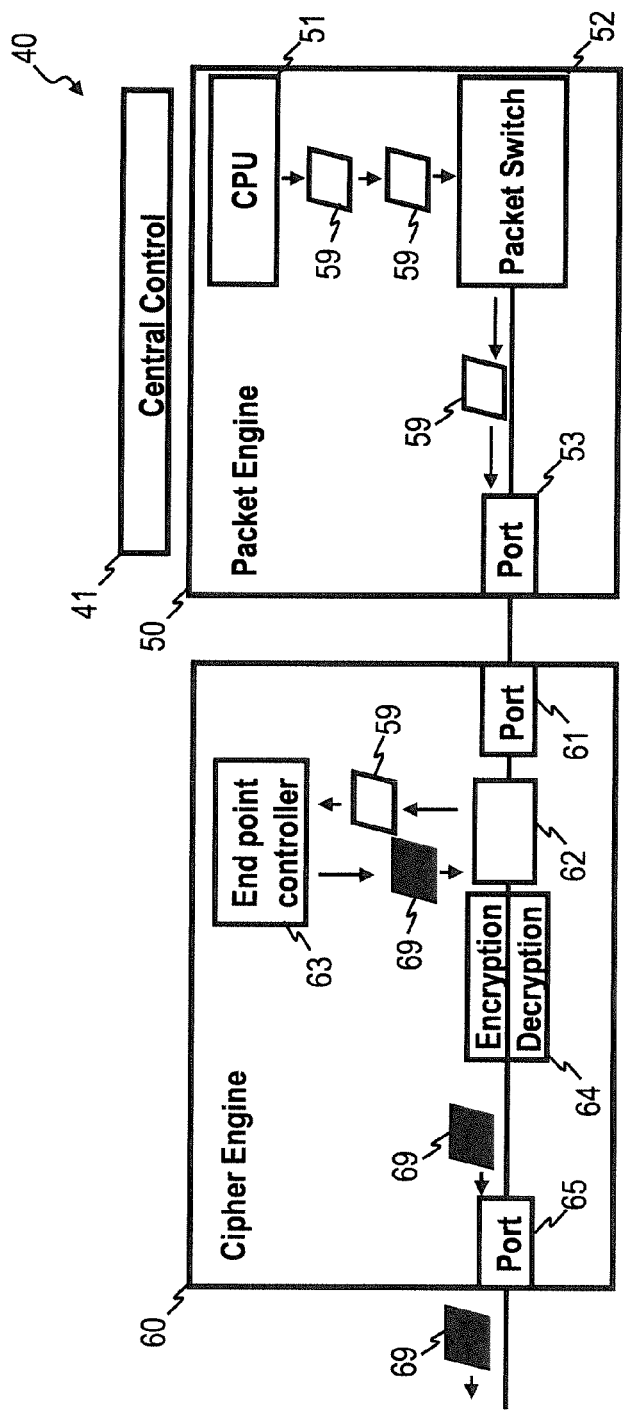
FIG. 2 is a block diagram of a packet engine and a cipher engine according to an embodiment.

Methods and devices according to embodiments will be explained in more detail below. FIG. 2 is a block diagram representation 40 of a packet engine 50 and an associated cipher engine 60. The cipher engine 60 may be directly connected, e.g., via Ethernet or optical cables, to the packet engine 50. A central control 41 may control several packet engines that may be provided in the same Label Edge Router (LER) or Label Switch Router (LSR), for example.

The packet engine 50 and the cipher engine 60 may be used for a working path or a protection path. Different packet engines and different cipher engines (or cipher engine instances) may be provided in a LER or LSR for the working path and the protection path, respectively.

The configuration and operation of the packet engine 50 may be used to implement each one of the plurality of packet engines 12, 22, 32 of the network 10 of FIG. 1. The configuration and operation of the cipher engine 60 may be used to implement each one of the plurality of cipher engines 14, 24, 34 of the network 10 of FIG. 1. While the operation of the packet engine 50 and the cipher engine 60 will be explained in the context of outgoing data traffic ("Alice" side of a secured path), similar functions may be implemented at the receiving node ("Bob" side of the secured path).

The packet engine 50 comprises a port 53. The port 53 is operative to perform time stamping, e.g., in accordance with the Precision Time Protocol (PTP), IEEE 1588 or IEC 61588 ed2.0. The packet engine 50 is operative to output pre-shaped data traffic via the port 53 to the cipher engine 60.

The packet engine 50 may generate dummy packets 59 for insertion into a data flow. The dummy packets 59 may be generated such that they do not include payload data, but merely provide packets included in the pre-shaped data traffic received by the cipher engine 60 that can be used by the cipher engine 60 for inserting control data thereinto, e.g. for encryption key exchange. The dummy packets 59 may include Generic Associated Channel Label (GAL) Signaling Communication Channel (SCC) packets, for example.

The dummy packets 59 may be generated by reading a packet template from memory. The packet template stored in memory may be generated, for example, by software or other computer readable instruction code executed by at least one processor of the central processing unit 51 of the packet engine 50 or by software running on the central control 41, as will be explained in more detail below.

The packet engine 50 inserts the dummy packets 59 into a data flow (i.e., a sequence of data packets including payload data). The packet engine 50 may insert the dummy packets 59 into the data flow at a repetition interval. The interval may be configurable. The interval may be configured by software or other computer readable instruction code executed by at least one processor of the central processing unit 51 of the packet engine 50 or by software running on the central control 41, as will be explained in more detail below. The interval at which dummy packets 59 are inserted into the data flow may be set such that the dummy packets 59 can be filled with all management channel transmissions that the cipher engine 60 must perform, e.g., for encryption key exchange or other security related management channel transmissions. More dummy packets 59 than actually required by the cipher engine 60 for management channel transmissions may be generated by the packet engine 50.

The dummy packets 59 may have an outer Ethernet header with predefined structure in Ether type, label, Channel Type, and PD. As the packet engine 50 is not aware how dummy packets 59 are used by cipher engine 60, it may generates empty section GAL packets without outer label. These dummy packets 59 avoid any addition of packets outside the time stamping context.

The dummy packets 59 may be SCC packets, that may be generated in the packet engine 50 at a regular interval of, for example, 3.3 ms. The dummy packets in the stream are filled and used for the management channel transmissions by the cipher engine 60. Dummy packets that are not needed for management channel transmissions can be discarded by the cipher engine 60.

The packet engine 50 may comprise a packet switch 52 that combines the dummy packets 59 with a sequence of data packets including payload data.

In addition, or possibly even as an alternative to, the insertion of the dummy packets 59, the packet engine 50 may delay the outputting of data packets, including packets with payload data and dummy packets without payload data, to enlarge the inter-packet gap. This may be done by the packet switch 52 or at the egress port 53. After a data packet has been output, the packet switch 52 or egress port 53 may purposefully delay the outputting of the subsequent data packet. Thereby, the gap between successive data packets may be enlarged. For illustration, successive data packets, including packets with payload data and dummy packets without payload data, may be output by the egress port 53 with a temporal spacing or gap therebetween that is enlarged as compared to the temporal spacing or gap at which the successive data packets would actually be available for transmission at the packet switch 52.

The enlargement of the inter-packet gap accommodates the addition of bytes to the data packets in the cipher engine 60, e.g., due to the encryption method. The packet switch 52 may delay the transmission of outgoing packets by an amount which may be configurable. By delaying the transmission of bytes of the egress packets, the packet engine 50 may enlarge the inter-packet gap according to the amount that has been configured.

In case the cipher engine 60 is directly connected to the packet engine 50 or the cipher engine 14, 24, 34 of one of the hops along the transmission path need to enlarge packets, it is always ensured that enlargement happens into the empty inter-packet gap. This is achieved by the traffic pre-shaping performed by the packet engine 50.

The size of the enlarged inter-packet gap may be configured by, e.g., the central control 41 or another entity. The size of the enlarged inter-packet gap may be configured such that, even as the data packet is processed at the cipher engine 60 and transmitted through plural hops via the MPLS-TP, the data packet grows only into the inter-packet gap, while preserving the ordering of data packets. An exemplary technique of determining the size of the enlarged inter-packet gap will be explained with reference to FIG. 10.

The sequence of data packets, including packets with payload data and dummy packets without payload data, which are output via the egress port 53 will be referred to as "pre-shaped data traffic" herein. It will be appreciated that the pre-shaped data traffic does not correspond to the data traffic that will be transmitted via the meshed network, e.g., the MPLS-TP. Rather, the cipher engine 60 may modify at least part or all of the dummy packets of the pre-shaped data traffic by inserting security related management channel information thereinto. The cipher engine 60 may also modify at least some of the data packets including payload data, such as the data packets including mission critical or other payload data that needs to be protected.

The cipher engine 60 has a port 61 coupled to the port 53 of the packet engine 50. Contrary to the packet engine 50, the cipher engine 60 is placed outside the time stamping context. I.e., the port 61 is not aware of PTP or other time stamping procedures. Similarly, the egress port 65 of the cipher engine 60 is not aware of PTP or other time stamping procedures. Time stamping is performed at the packet engine 50, while the cipher engine 60 may operate without using the time stamping information and without having any knowledge of a time stamping protocol. The cipher engine 60 may not include any component that is aware of IEEE 1588 or other time stamping techniques.

The cipher engine 60 comprises the port 61 that may be coupled to the port 53 of the packet engine 50 via an Ethernet or optical cable.

The cipher engine 60 may comprise a device 62, e.g. a packet switch, to provide the dummy packets 59 to a controller 63 or other integrated semiconductor circuit when the cipher engine 60 needs to generate control packets for management channel transmissions, such as encryption key exchange. The device 62 may select the dummy packets from the incoming pre-shaped data traffic. For this, the cipher engine 60 may scan every packet header to discriminate, e.g., SCC packets from regular data traffic including payload data.

Dummy packets 59 that are not required for management channel transmissions may be removed from the pre-shaped data traffic by the cipher engine 50.

The controller 63 may fill at least part of the dummy packets 59 with management channel related control data, in particular relating to encryption and/or authentication. The controller 63 may use at least some of the dummy packets 59 for encryption key exchange, for example. By filling at least part of the dummy packets 59 with security related management channel control data, control packets 69 are generated. The device 62 may re-insert the control packets 69 into the pre-shaped data traffic, e.g., at the locations of the dummy packets 59.

The cipher engine 60 comprises an encryption/decryption unit 64. The encryption/decryption unit 64 may perform encryption/decryption operations. While not shown, an authentication unit for authentication operations may be integrated into the encryption/decryption unit 64 or may be provided separately therefrom. The cipher engine 60 may use any one of a variety of known encryption/decryption and/or authentication techniques. The cipher engine 60 may include dedicated hardware, such as a physical random number generator, for performing security related functions. The physical random number generator may generate random numbers from a physical process, such as by performing measurements on a quantum system, with the measurements yielding discrete outcomes in accordance with a truly random process.

The processing of the data packets in the pre-shaped data traffic that include payload data by the cipher engine 60 may affect the size of the data packets. However, due to the pre-shaping of the data traffic, it is ensured that the ordering of data packets is the same when leaving the cipher engine 60 and when arriving at the port 61.

The cipher engine 60 may output the data traffic via port 65, e.g., for transmission to a remote endpoint the secure end-to-end path (i.e., "Bob"). Due to the pre-shaping of the data traffic, it is ensured that the ordering of data packets is the same when leaving the cipher engine 60 and when arriving at the port 61.

At the receive side, i.e., where the data traffic leaves the secured path, the cipher engine may remove all control packets 69. Thereby, the control packets with security related information, such as encryption keys, may be kept inside the path between two cipher engines (such as cipher engines 14, 24 in FIG. 1) and is not provided to the associated packet engines (such as packet engines 12, 22 in FIG. 1).

The packet engine 50 and cipher engine 60 operate such that a relative timing and ordering of transmitted critical data packets during data transmission of encrypted and authenticated data is preserved during transmission of encrypted and authenticated data, although the cipher engine 60 is placed outside the time stamping context.

Encryption of data transmissions, such as securing a stream of MPLS packets, is done by the cipher engine 60, which is separated from the packet engine 50 responsible for packet forwarding, respective switching. All packet handling, filtering and queuing is done in the packet engine 50, which is placed inside time stamping context. The cipher engine 60 is placed outside the time stamping context, as explained above.

As used herein, preserving relative timing and ordering of data packets can mean in particular that the time difference between the start of consecutive data packets remains unchanged, and the order of data packets remains unchanged. This does not only apply to processing at the cipher engine 60, but may also apply as the data packets are transmitted from one hop to the next in the packet network 10.

Data packet time-stamping in the packet engine 50 may be done according PTP at an ingress/egress port 53 of the packet engine 50. To enable proper liming precision of time stamping, pulse per second and clock signals may be provided to a chip responsible for time stamping at the in/egress port 53. In addition, absolute time information may be delivered via a message, e.g. a software message, from an internal time master to the respective chip at the in/egress port 53 at a fixed time interval, e.g., with a 1 second interval, in synchronization with the pulse per second. The chip for the egress port 53 may either add absolute exit/entry time to incoming/outgoing packets or may add a resident time value to already existing entry time information when the packet is transiting the packet engine 50.

In this manner, data packets may be time stamped at the ingress ports and egress ports of the packet engine 50 to allow an end-to-end transmission of timing/clock information to every node in the network 10 according to PTP. The cipher engine 60, however, may be operative such that it does not use the timing/clock information.

Figure 3:
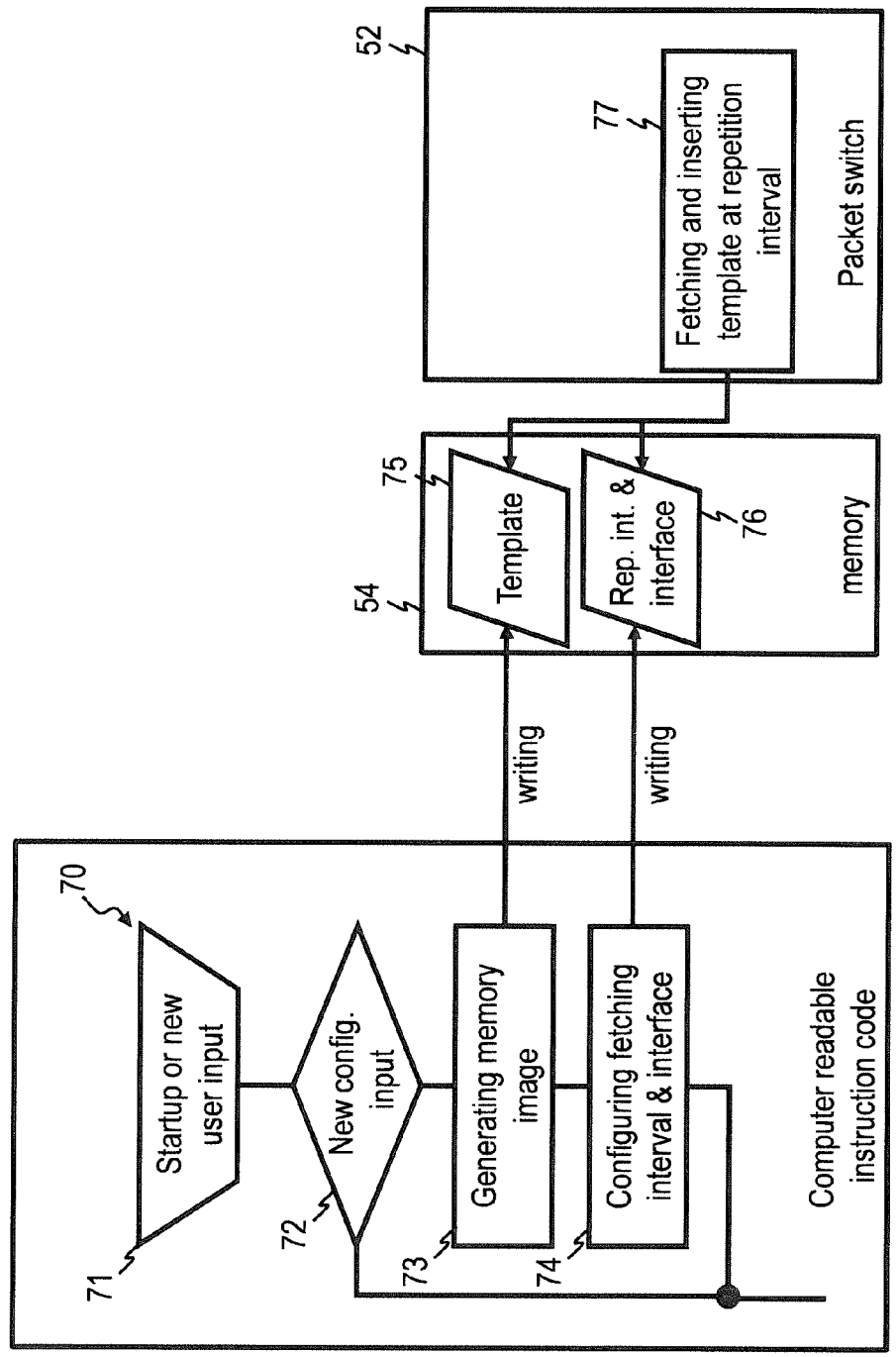
FIG. 3 is a diagram illustrating operation of a packet engine according to an embodiment.

FIG. 3 is a diagram illustrating the generation and insertion of dummy packets 59 by the packet engine 50 according to an exemplary embodiment. The repetition interval and interface at which the dummy packets 59 are output may be configured by machine readable instruction code, such as software, that may be executed by the CPU 51 of the packet engine 50, by the central control 41, or another entity.

The procedure 70 performed by execution of the machine readable instruction code may be triggered by a user input or device start-up of, e.g., the packet engine 50.

At step 71, the procedure 70 starts in response to a user input or device start-up of, e.g., the packet engine 50.

If it is determined at step 72 that a new template for the dummy packet is to be generated, at step 72 the machine readable instruction code, e.g., software, running on a CPU attached to the packet engine 50 or on the CPU 51 of the packet engine 50 may generate a template as an image for the dummy packet. The template 75 may be placed in memory 54, which may be shared memory of the packet switch 52 and the CPU 51.

At step 74, the machine readable instruction code, e.g., software, executed on the CPU 51 may configure the packet switch 52 of the packet engine 50 to fetch the image from the memory 54 at a regular time interval. To this end, information 76 on the repetition interval may be written into a register. Information on the interface or port via which dummy packets are to be output may also be placed in the memory 54. This triggers the outgoing interface of the packet switch 52 to place dummy packets 59 into data flow according to the information 75, 76, which may be stored in registers of the shared memory 56.

The packet switch 52 may fetch the image 75 from the shared memory 54 at a regular interval and may place it into the data flow at the specified port, as schematically illustrated at 77. The packet switch 52 may fetch the memory image 75, which acts as template for the dummy packet, and may place it into the data traffic stream at a regular interval, as specified in the register information 76.

Figure 4:
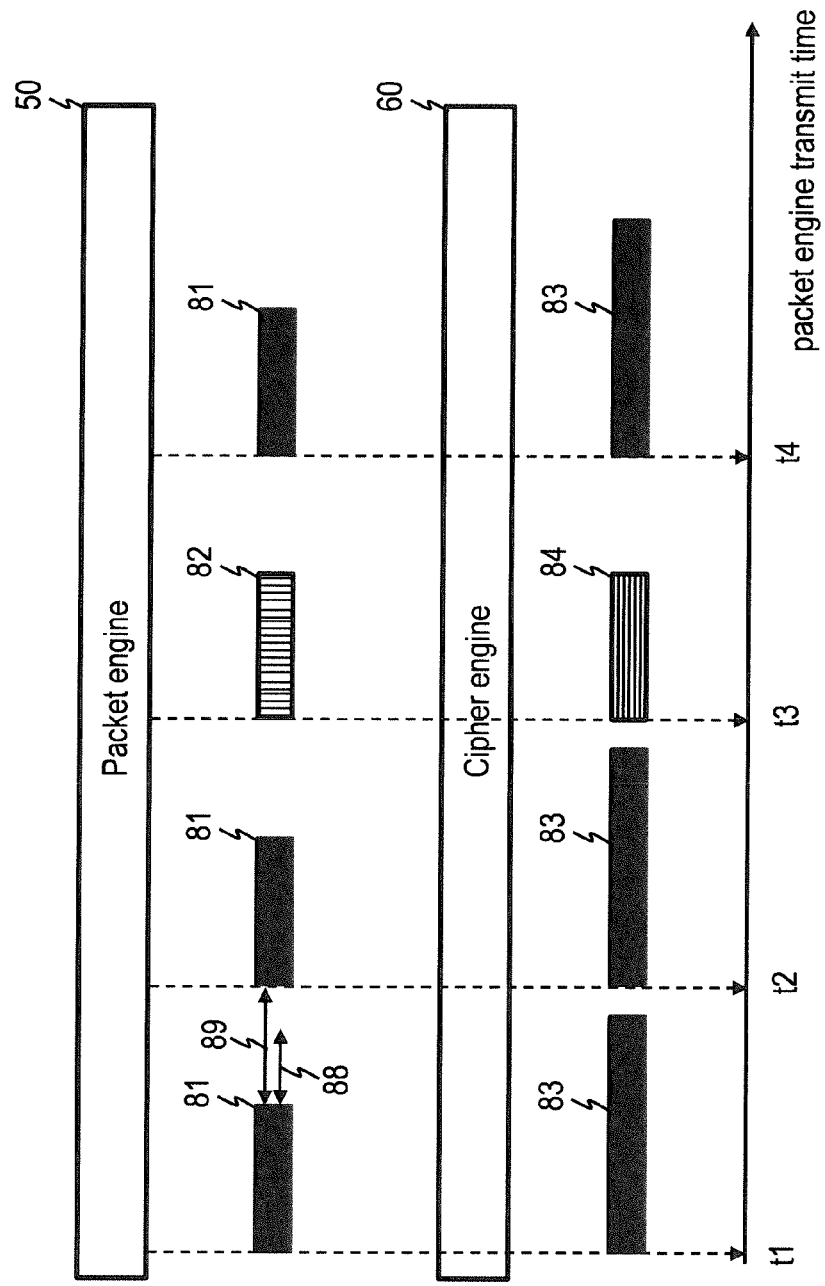
FIG. 4 is a diagram illustrating operation of a packet engine and of a cipher engine according to an embodiment.

FIG. 4 is a diagram illustrating the operation of the packet engine 50 and cipher engine 60 of a node (endpoint node or intermediate hop) according to an embodiment. The packet engine 50 outputs pre-shaped data traffic including data packets 81 that include payload data. The packet engine 50 outputs dummy packets that do not include payload data. The packet engine 50 may insert additional dummy bytes 88 after a data packet 81, so as to ensure that the enlarged inter-packet gap 89 has a desired size. The size of the enlarged inter-packet gap 89 is set so as to ensure that the encryption and/or authentication operations performed by the cipher engine 60 grow the data packets 81 only into the enlarged inter-packet gap 89, but do not exceed the gap.

As the cipher engine 60 performs encryption and/or authentication operations, data packets 83 may include the encrypted counterpart of the original payload of the associated data packet 81 and, optionally, authentication information. The data packets 83 have an increased size as compared to the data packets 81. However, the increase in packet size due to the encryption and/or authentication operations never exceeds the enlarged inter-packet gap 89. The time difference between the start of successive data packets 83 leaving the cipher engine 60 is identical to the difference between the start of successive data packets 81 entering the cipher engine 60.

The cipher engine 60 may use the dummy packet 82 already generated by the packet engine 50 for management channel transmissions. The cipher engine may insert security related control information, such as encryption key exchange, into the dummy packet 82, thereby converting the already existing dummy packet 82 into a control packet 84.

The operation of the cipher engine 60 does not add jitter, but preserves the relative timing and ordering of data packets.

FIG. 5 and FIG. 6 illustrate operation of the cipher engine 60 when performing encryption and/or authentication operations on a data packet 90 received from the packet engine 50. The packet engine 50 has enlarged the inter-packet gap 99 to a value of, e.g., 36 bytes. The data packet 90 may be an unencrypted MPSL data packet. The data packet 90 may include a preamble and start frame delimiter (SFD) 91. The data packet 90 may include a destination address media access control (MAC) address 92. The data packet 90 may include a source address media access control (MAC) address 93. The data packet 90 may include a MPLS Label Switched Path (MPLS LSP) 94. The data packet 90 may include a MPLS Pseudo-Wire (MPLS PW) 95. The data packet 90 includes unencrypted Pseudo-Wire payload 96. The data packet 90 may include a Frame Check Sequence (FCS) 97.

FIG. 5 illustrates the encrypted data packet 100, which results from the encryption operation of the cipher engine 60 when applied to the data packet 90. An encryption code 101 may be added included in the encrypted data packet 100. The encrypted data packet 100 includes encrypted payload 102, which may be generated from the MPLS PW 95 and the PW payload 96. The encrypted payload 102 may define the encrypted service data.

Encryption causes the encrypted data packet 100 to have a size that exceeds that of its unencrypted counterpart 90. However, the inter-packet gap 99 is enlarged by the packet engine 50 such that the increase in size of the encrypted data packet 100, as compared to the unencrypted data packet 90, does not exceed the enlarged inter-packet gap 99. The cipher engine 50 grows the data packet into, but not beyond the enlarged inter-packet gap 99. A finite inter-packet gap 108 may remain between successive encrypted data packets. For illustration, the inter-packet gap 108 may have 28 bytes, when the encryption code 101 has 8 bytes.

FIG. 6 illustrates the encrypted data packet 105 with authentication, which results from the encryption operation and an authentication operation of the cipher engine 60 when applied to the data packet 90. An authentication code 103 may be included in the encrypted data packet 105. The encrypted payload 102 and authentication code 103 may define the encrypted service data.

Encryption and authentication causes the encrypted data packet 105 with authentication to have a size that exceeds that of its unencrypted counterpart 90. However, the inter-packet gap 99 is enlarged by the packet engine 50 such that the increase in size of the encrypted data packet 105 with authentication, as compared to the unencrypted data packet 90, does not exceed the enlarged inter-packet gap 99. The cipher engine 50 grows the data packet into, but not beyond the enlarged inter-packet gap 99. A finite inter-packet gap 109 may remain between successive encrypted data packets with authentication. For illustration, the inter-packet gap 109 may have 12 bytes, when the authentication code 103 has 16 bytes.

FIG. 7 illustrates a GAL SCC packet structure as an example of a dummy packet 59 that is periodically inserted into the data flow by the packet engine 50. The GAL SCC packet may have the following structure, for example (total 92 bytes): Ethernet Header: 14 bytes (DMAC 6 bytes, SMAC 6 bytes, Ethertype 2 bytes); MPLS GAL header including PID: 10 bytes (without LSP shim header, RFC5718); SCC payload: 64 bytes; CRC: 4 bytes.

When generated by the packet engine 50, the SCC payload may be empty, e.g., filled with random numbers or filled with 0 or 1 only. The cipher engine 60 may insert management channel data into the SCC payload of the GAL SCC packet.

Empty section GAL SCC dummy packets may be used in the MPLS-TP context, allowing the cipher engine 60 to provide control packets 69 without adding any packets for end-to-end or segment encryption/decryption control flows. To ensure that generated GAL SCC packets with specific PID are deleted when exiting the secured flow, the packet engine 50 or the cipher engine 60 at the receiving side of the pseudo-wire may delete packets when detecting them. During transmission of control packets 69 from start to end across multiple hops, an additional outer MPLS header is added. The GAL SCC header is not visible. This assures that the GAL SCC dummy packets are only deleted after the endpoint cipher engine 60 strips the outer header. In this way, the end-to-end MPLS packet flow can be kept free from these control packets.

When the cipher engine 60 needs to use control packets 69, it may select a dummy packet 59 from the pre-shaped data traffic provided by the packet engine 50. For this, the cipher engine 60 may scan every packet header. The cipher engine 60 may use the following rule to discriminate the SCC packets from regular traffic: (Ethertype==0x8847)&& (S==1 && label==13)&&(ChannelType==2)&& (PID==xxx) of byte 13-14 byte 15-18 byte 21-22 byte 23-24 of the GAL SCC packet illustrated in FIG. 7.

As the packet engine 50 is not aware how GAL SCC dummy packets are used by the cipher engine 60, the packet engine 50 just generates empty section GAL packets without outer label.

The cipher engine 60 may use these packets
- as is, for encryption key exchange between 2 adjacent MPLS nodes;
- for LSP end-to-end encryption key exchange by adding an outer MPLS header.

The link between the packet engine 50 and the cipher engine 60 can be treated as a MPLS section management channel. According to MPLS-TP standards, control communication can be done using the following options:
- LSP end-to-end management channels: Here the cipher engine 60 inserts the 4 byte LSP header between the Ethertype bits and the GAL header. This way it maps the encryption end-to-end relationship onto the MPLS end-to-end relationship. To avoid an increase in packet size, the enlargement of the header is done on expense of payload size.
- Next hop or section management channels: In case cipher engine 60 needs just to communicate with cipher engine 60 at next hops, it will keep the packet structure as is, i.e. not insert the LSP shim header. The payload size remains 64 bytes.
- If, due to a mistake in network configuration section, GAL SCC packets are received at the port 53 of the packet engine 50, they will be simply deleted in the packet switch 52. As GAL SCC headers are visible, the packet switch 52 may perform the following checks for this: whether label is 13 (GAL), whether channel type is SCC, and whether PID is defined for encryption communication channel.

Figure 8:
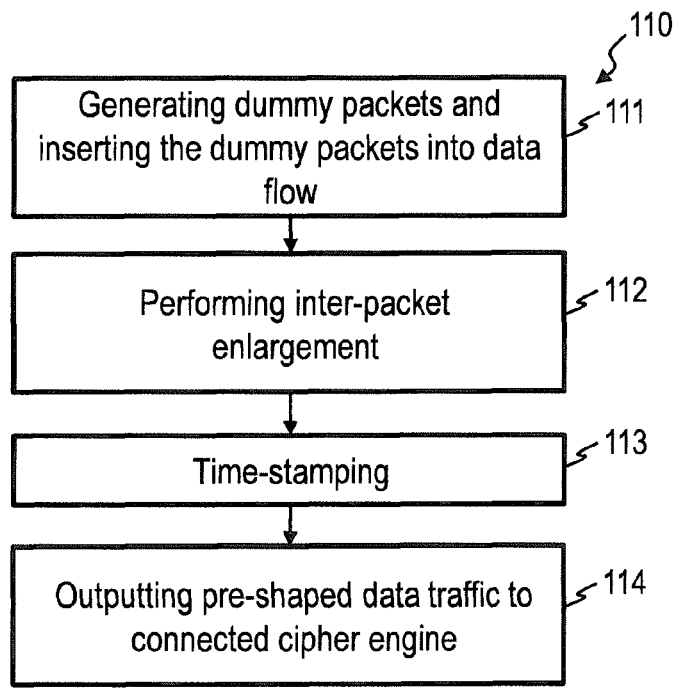
FIG. 8 is a flow chart of a process performed by a packet engine in a method according to an embodiment.

FIG. 8 is a flow chart of a procedure 110 that may be performed by a packet engine 50 in a method according to an embodiment.

At step 111, the packet engine 50 may generate dummy packets 59. The dummy packets 59 may be generated at regular time intervals. The dummy packets 59 may be inserted into a data flow that comprises data packets carrying payload data.

At step 112, the packet engine 50 may perform inter-packet gap enlargement. The size of the enlarged inter-packet gap may be configured dynamically and may depend on the port and the configured paths for the port over which the data packets are transmitted after encryption and, optionally, authentication.

At step 113, the packet engine 50 may perform time-stamping. Time-stamping may be performed at an egress port of the packet engine 50 and prior to encryption and, optionally, authentication.

At step 114, the pre-shaped data traffic may be output to the cipher engine 60 that is directly connected to, and that may be positioned within the same rack or bay, as the packet engine 50.

Figure 9:
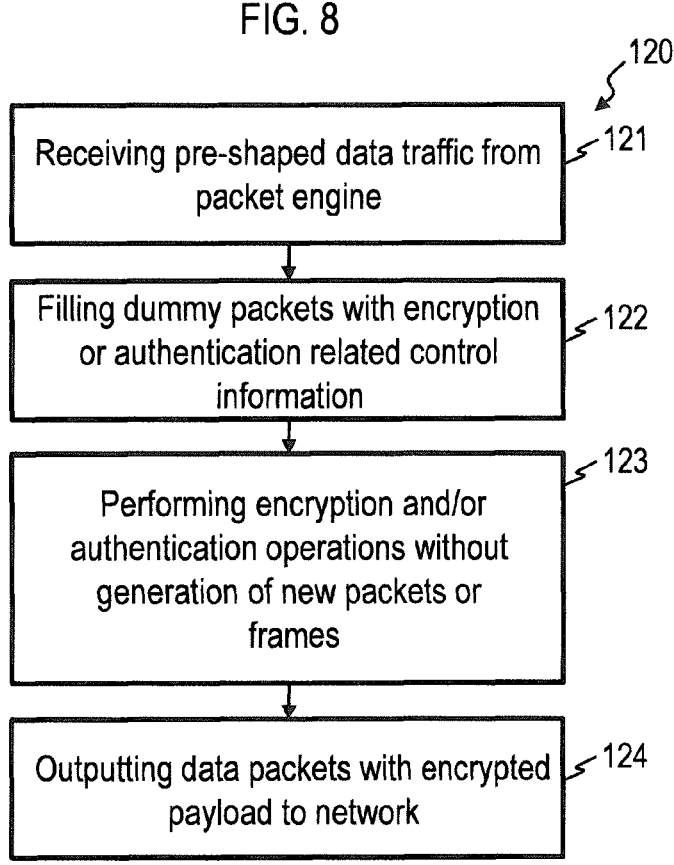
FIG. 9 is a flow chart of a process performed by a cipher engine in a method according to an embodiment.

FIG. 9 is a flow chart of a procedure 120 that may be performed by a cipher engine 60 in a method according to an embodiment.

At step 121, the cipher engine 60 receives the pre-shaped data traffic from the packet engine 50 that is directly connected to, and that may be positioned within the same rack or bay, as the cipher engine 60.

At step 122, the cipher engine 60 may fill at least part of the dummy packets 59 with encryption or authentication related control information. The cipher engine 60 may delete or drop dummy packets 59 that are not needed for management channel transmissions. The cipher engine 60 may perform management channel transmissions without adding packets to the data traffic, while using at least part of the dummy packets 59 that have been generated by the packet engine 50 for management channel transmissions.

At step 123, the cipher engine 60 may perform encryption and/or authentication operations. The cipher engine 60 may perform these operations without adding new packets, and by growing the data packets into the inter-packet gaps.

At step 124, the cipher engine may output the data packets with encrypted payload and, optionally, with authentication for transmission via a secured end-to-end path of a protected tunnel in the MPLS network, for example.

The enlarged inter-packet gap may have a size that may depend on the configured paths in the network. The size of the enlarged inter-packet gap may depend on the port via which the data traffic is output. The size of the enlarged inter-packet gap may be dynamically configured.

Figure 10:
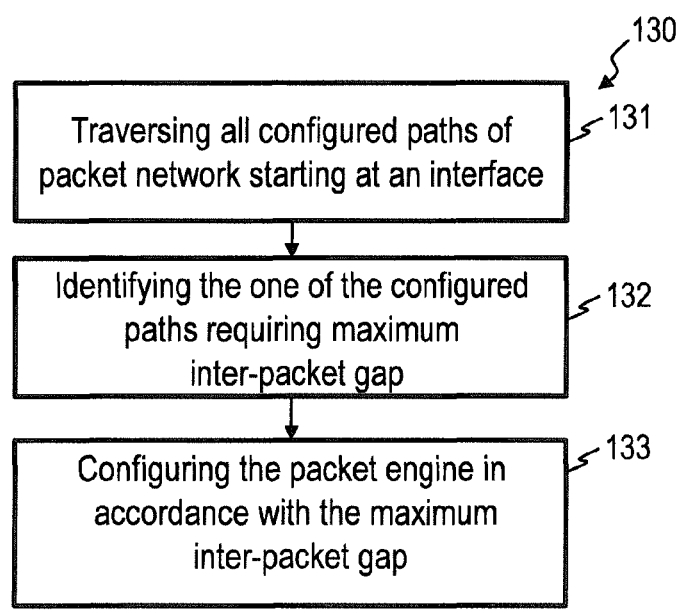
FIG. 10 is a flow chart of a process of configuring an inter-packet gap that may be performed in a method according to an embodiment.

FIG. 10 is a flow chart of a procedure 130 of configuring the size of the enlarged inter-packet gap in a method according to an embodiment. The procedure 130 allows the size to be configured dynamically depending on the enlargement needed at a specific port.

At step 131, a calculation can be done that includes computationally traversing all configured paths on the interface. The required inter-packet gap for each path is computed. The required inter-packet gap may be determined in terms of a number of bytes. For example, for adding standard message authentication, 24 bytes are added to the target size of the inter-packet gap at the packet engine. This would provide 36 bytes as inter-packet gap in contrast to 12 bytes according to standard.

At step 132, the path with the need for the maximum inter-packet gap is identified. This path is used to decide on the inter-packet gap for the interface. I.e., the inter-packet gap for the interface may be selected from values determined at step 131, so that the maximum of those values is selected as size for the inter-packet gap.

At step 133, the packet engine 50 may be configured in accordance with the inter-packet gap determined at steps 131 and 132.

The CPU 51 may build a proper register byte sequence to be written into a register of the packet switch 52. This triggers the packet switch 52 to wait for n bytes between consecutive transmissions of egress data packets.

The methods, devices, and systems according to embodiments of the invention address the need for enhanced cyber security in networks for mission critical applications, for example. The combination of data traffic pre-shaping, which may include the enlargement of inter-packet gaps and/or addition of dummy packets, a system is provided which does not require packets to be added at the cipher engine stage. Packets grow only into empty inter-packets gaps. Separation and combination of a sub-stream that is 'to be processed' and a sub-stream that is 'not to be processed' at intermediate nodes do therefore naturally interleave. No disturbance is created in packet timing and ordering.

The methods, devices, and systems according to embodiments provide a wire-like determinism for encrypted and/or authenticated packet data transmission, even when transiting through complex meshed network.

While exemplary embodiments have been explained with reference to the drawings, modifications and alterations may be implemented in other embodiments. The methods, devices, and systems may be used for MPLS networks, without being limited thereto.

As will be understood by the skilled person, the embodiments disclosed herein are provided for better understanding and are merely exemplary. Various modifications and alterations will occur to the skilled person without deviating from the scope of the invention as defined by the claims.

The invention claimed is:

1. A method, comprising:
pre-shaping data traffic to produce a pre-shaped data traffic, wherein the pre-shaping the data traffic includes inserting dummy packets into a data flow;
performing encryption or authentication operations on the pre-shaped data traffic, wherein the pre-shaping the data traffic contributes to preserving of relative timing and ordering of data packets transmitted in a packet network; and
using at least part of the dummy packets for management channel transmissions or for Encryption Key Exchange (EKE).

2. The method of claim 1, wherein the performing encryption or authentication operations is without insertion of additional packets into the pre-shaped data traffic.

3. The method of claim 1, wherein the inserting the dummy packets into the data flow comprises the following steps performed in response to a start-up or a new user input:
generating a memory image and writing the memory image as a template to memory;
fetching the memory image from the memory at a repetition interval; and
inserting the memory image into the data flow.

4. The method of claim 1, wherein the dummy packets comprise empty section Signaling Communication Channel (SCC) packets.

5. The method of claim 4, further comprising deleting SCC packets that exit an encrypted or authenticated data flow.

6. The method of claim 1, wherein the pre-shaping the data traffic further comprises enlarging an inter-packet gap.

7. The method of claim 6, wherein the enlarging the inter-packet gap comprises inserting additional bytes into the data flow, or delaying transmission of a data packet in the data flow.

8. The method of claim 6, wherein the enlarging the inter-packet gap comprises enlarging a data packet into the inter-packet gap in response to the performing the encryption or authentication operations.

9. The method of claim 6, wherein a size of the enlarged inter-packet gap is configurable.

10. The method of claim 6, further comprising determining a size of the enlarged inter-packet gap, the determining comprising:
traversing all configured paths in the packet network;
using the one of the configured paths requiring a maximum inter-packet gap to determine the enlarged inter-packet gap; and
building a register byte sequence and writing the register byte sequence into a register to trigger a delayed transmission of data packets.

11. The method of claim 1, further comprising performing a time stamping operation on the pre-shaped data traffic before the encryption or authentication operations.

12. The method of claim 1, wherein the performing the encryption or authentication operations operates outside a time stamping context, wherein the pre-shaping the data traffic operates inside the time stamping context, and wherein operating inside the time stamping context corresponds to operating in accordance with a time stamping protocol.

13. The method of claim 1, wherein the packet network is a packet network of an industrial automation control system, automation of high voltage lines, steering of high-speed trains, or controlling air traffic.

14. The method of claim 1, wherein the inserting the dummy packets into the data flow comprises inserting the dummy packets into the data flow at a repetition interval.

15. The method of claim 1, wherein the pre-shaping the data traffic is performed by a packet engine circuit, and wherein the performing the encryption or authentication operations is performed by a cipher engine circuit.

16. The method of claim 1, wherein the performing the encryption or the authentication operations on the pre-shaped data traffic comprises:
performing encryption operations on the pre-shaped data traffic; and
performing authentication operations on the pre-shaped data traffic.

17. The method of claim 1, wherein the inserting the dummy packets into the data flow comprises inserting the dummy packets into the data flow at a repetition interval.

18. A packet engine for handling data packets in a packet network, the packet engine comprising:
a first circuitry couplable to a second circuitry, the first circuitry configured to:
control pre-shaping of data traffic to produce a pre-shaped data traffic, wherein the pre-shaping the data traffic includes inserting dummy packets into a data flow and wherein the pre-shaped data traffic can be outputted to the second circuitry so that the second circuitry can perform encryption or authentication operations on the pre-shaped data traffic; and
contribute to preserving of relative timing and ordering of data packets transmitted in the packet network by the pre-shaping of the data traffic; and an interface, wherein the first circuitry is couplable to the second circuitry via the interface, and wherein the first circuitry is configured to enlarge an inter-packet gap at the interface.

19. The packet engine of claim 18, wherein the first circuitry is configured to contribute to the preserving of relative timing and ordering of data packets by preserving an unchanged time difference between a start of consecutive data packets and preserving an unchanged order of data packets.

20. The packet engine of claim 18, wherein the first circuitry is configured to insert the dummy packets into the data flow at a repetition interval.

21. The packet engine of claim 18, wherein the first circuitry and the second circuitry is a same circuitry.

22. The packet engine of claim 18, wherein the first circuitry is coupled to the second circuitry.

23. The packet engine of claim 18, wherein at least part of the dummy packets is used for management channel transmissions or Encryption Key Exchange (EKE).

24. A system, comprising:
a first circuitry configured to:
pre-shape data traffic by inserting dummy packets into a data flow at a repetition interval to produce a pre-shaped data traffic, and
contribute to, by pre-shaping the data traffic, preserving of relative timing and ordering of data packets transmitted in a packet; and
a second circuitry configured to:
perform encryption or authentication operations on the pre-shaped data traffic, and contribute to preserving an unchanged time difference between a start of consecutive data packets and preserving an unchanged order of data packets.

25. The system of claim 24, wherein the first circuitry and the second circuitry is a same circuitry.

26. The system of claim 24, wherein at least part of the dummy packets is used for management channel transmissions or Encryption Key Exchange (EKE).

27. The system of claim 24, further comprising an interface, wherein the first circuitry is couplable to the second circuitry via the interface, and wherein the first circuitry is configured to enlarge an inter-packet gap at the interface.

28. A method, comprising:
generating a pre-shaped set of data packets comprising one or more dummy packets and an original set of data packets, wherein the generating the pre-shaped set of data packets comprises inserting the dummy packets into the original set of data packets; and
generating a secured set of data packets from the pre-shaped set of data packets, a number of packets associated with the secured set of data packets is equal in size to a number of packets associated with the pre-shaped set of data packets, and the secured set of data packets comprises one or more of an encrypted, decrypted or authenticated replacement of the original set of data packets, wherein the generating the pre-shaped set of data packets and the generating the secured set of data packets contributes to preserving of relative timing and ordering of data packets transmitted in a packet network.

29. The method of claim 28, wherein the generating the secured set of data packets comprises inserting information corresponding to management channel transmissions or a signal for Encryption Key Exchange (EKE) into the one or more dummy packets of the pre-shaped set of data packets.

30. The method of claim 28, wherein the generating the secured set of data packets comprises generating the encrypted, decrypted, or authenticated replacement of the original set of data packets without insertion of additional packets into the pre-shaped set of data packets.

31. The method of claim 28, wherein the dummy packets comprise empty section Signaling Communication Channel (SCC) packets, and wherein the method further comprises deleting the empty section SCC packets from the secured set of data packets.

32. The method of claim 28, wherein generating the pre-shaped set of data packets comprises generating an enlarged inter-packet gap corresponding to inserting one or more data bytes between successive packets of the original set of data packets on a physical layer.

33. The method of claim 28, further comprising performing time stamping before generating the secured set of data packets, wherein the performing the time stamping is in accordance with a time stamping protocol.

34. The method of claim 28, wherein the original set of data packets corresponds to a packet network of an industrial automation control system, automation of high voltage lines, steering of high speed trains, or controlling air traffic.

35. A computer program product, comprising a non-transitory computer usable storage having a computer readable program code embodied therein, the computer readable program code adapted to be executed to implement a method, the method comprising:
generate a pre-shaped set of data packets comprising one or more dummy packets and an original set of data packets, wherein the generating the pre-shaped set of data packets comprises inserting the dummy packets into the original set of data packets; and
generate a secured set of data packets from the pre-shaped set of data packets, a number of packets associated with the secured set of data packets is equal in size to a number of packets associated with the pre-shaped set of data packets, and the secured set of data packets comprises one or more of an encrypted, decrypted or authenticated replacement of the original set of data packets, wherein the generating the pre-shaped set of data packets and the generating the secured set of data packets contributes to preserving of relative timing and ordering of data packets transmitted in a packet network.

36. The computer program product of claim 35, wherein to generate the secured set of data packets comprises inserting the dummy packets into the original set of data packets.

37. The computer program product of claim 35, wherein to generate the secured set of data packets comprises performing one or more of encryption, decryption, or authentication of the original set of data packets without insertion of additional packets into the pre-shaped set of data packets.

38. The computer program product of claim 35, wherein to generate the pre-shaped set of data packets comprises delaying transmission of a data packet of the original set of data packets.

39. The computer program product of claim 35, wherein to generate the pre-shaped set of data packets comprises performing one or more of encryption, decryption, or authentication of the original set of data packets, by enlarging the original set of data packets into an inter-packet gap.

40. The computer program product of claim 35, wherein at least a subset of the dummy packets is used for management channel transmissions or Encryption Key Exchange (EKE).

41. A computer program product, comprising a non-transitory computer usable storage having a computer readable program code embodied therein, the computer readable program code adapted to be executed to implement a method, the method comprising:
- pre-shape data traffic to produce a pre-shaped data traffic, wherein the pre-shaping the data traffic includes inserting dummy packets into a data flow;
- perform encryption or authentication operations on the pre-shaped data traffic, wherein the pre-shaping the data traffic contributes to preserving of relative timing and ordering of data packets transmitted in a packet network; and
- use at least part of the dummy packets for management channel transmissions or for Encryption Key Exchange (EKE).

42. The computer program product claim 41, wherein to perform the encryption or authentication operations comprises performing the encryption or authentication without insertion of additional packets into the pre-shaped data traffic.

43. The computer program product of claim 41, wherein to insert the dummy packets into the data flow comprises performing in response to a start-up or a previously presented user input:
- generate a memory image and write the memory image as a template to memory;
- fetch the memory image from the memory at a repetition interval; and
- insert the memory image into the data flow.

* * * * *